United States Patent
Siegel (10) Patent No.: US 12,486,366 B2
(45) Date of Patent: Dec. 2, 2025

(54) METHOD FOR WELDING FOAM PARTICLES

(71) Applicants: Kurtz GmbH, Kreuzwertheim (DE); Rolf Siegel, Würzburg (DE)

(72) Inventor: Rolf Siegel, Würzburg (DE)

(73) Assignee: Kurtz GmbH, Kreuzwertheim (DE)

( * ) Notice: Subject to any disclaimer, the term of this patent is extended or adjusted under 35 U.S.C. 154(b) by 1019 days.

(21) Appl. No.: 17/296,059

(22) PCT Filed: Nov. 25, 2019

(86) PCT No.: PCT/EP2019/082468
§ 371 (c)(1),
(2) Date: May 21, 2021

(87) PCT Pub. No.: WO2020/104702
PCT Pub. Date: May 28, 2020

(65) Prior Publication Data
US 2021/0395471 A1    Dec. 23, 2021

(30) Foreign Application Priority Data
Nov. 24, 2018 (DE) ............. 10 2018 009 255.1

(51) Int. Cl.
C08J 3/28 (2006.01)
C08J 3/24 (2006.01)
C08J 9/224 (2006.01)
C08J 9/232 (2006.01)
C08L 29/04 (2006.01)

(52) U.S. Cl.
CPC ............. *C08J 3/246* (2013.01); *C08J 3/28* (2013.01); *C08J 9/224* (2013.01); *C08J 9/232* (2013.01); *C08L 29/04* (2013.01); *C08J 2367/02* (2013.01); *C08J 2429/04* (2013.01)

(58) Field of Classification Search
CPC ..... C08J 3/346; C08J 3/28; C08J 9/224; C08J 9/232; C08J 2367/02; C08J 2429/04; C08J 7/0427; C08J 7/056; C08J 2300/22; C08J 2323/06; C08J 2323/12; C08J 2325/06; C08J 2367/04; C08J 2371/00; C08J 2375/04; C08J 2377/00; C08L 29/04
See application file for complete search history.

(56) References Cited

U.S. PATENT DOCUMENTS

| | | | |
|---|---|---|---|
| 3,060,513 A | 10/1962 | Klink et al. | |
| 3,242,238 A | 3/1966 | Edberg et al. | |
| 5,128,073 A | 7/1992 | Allen et al. | |
| 2010/0032856 A1* | 2/2010 | Hahn | C08J 9/224 264/41 |
| 2013/0309480 A1* | 11/2013 | Siegel | D04H 1/64 428/221 |

FOREIGN PATENT DOCUMENTS

| | | |
|---|---|---|
| CN | 107406614 A | 11/2017 |
| DE | 102007035560 A1 | 1/2009 |
| DE | 10 2016 123 214 A1 | 6/2018 |
| EP | 2 6 70 906 | 12/2013 |
| EP | 3 053 947 A1 | 10/2016 |
| GB | 1345265 A | 1/1974 |
| GB | 1403326 | 8/1975 |
| WO | WO 01/64414 A1 | 9/2001 |
| WO | WO 2008/043700 A1 | 4/2008 |
| WO | WO 2012/103876 A2 | 8/2012 |
| WO | WO 2013/050581 A1 | 4/2013 |
| WO | WO 2018/100154 A2 | 6/2018 |

OTHER PUBLICATIONS

International Search Report of the International Searching Authority, mailed on Jan. 13, 202, from International Application No. PCT/EP2019/082468, filed on Nov. 25, 2019. 6 pages.
Written Opinion of the International Searching Authority, mailed on Jan. 13, 202, from International Application No. PCT/EP2019/082468, filed on Nov. 25, 2019. 5 pages.
International Preliminary Report on Patentability, mailed on Jun. 3, 2021, from International Application No. PCT/EP2019/082468, filed on Nov. 25, 2019. 14 pages.
Notification of First Office Action, issued on Aug. 12, 2022, from Chinese Application No. 201980077256.3, filed on Nov. 25, 2019. 17 pages.

* cited by examiner

*Primary Examiner* — K. Boyle
(74) *Attorney, Agent, or Firm* — HoustonHogle LLP (57) ABSTRACT

The present invention relates to methods for the welding of foam particles, by electromagnetic waves, wherein foam particles with a surface modification are welded in a molding tool by electromagnetic waves, wherein the surface modification is produced by contacting the foam particles with a solution containing polymers which are capable of forming intra- or inter-molecular covalent bonds, under the conditions required for this purpose.

16 Claims, 3 Drawing Sheets

METHOD FOR WELDING FOAM PARTICLES

RELATED APPLICATIONS

This application is a § 371 National Phase Application of International Application No. PCT/EP2019/082468, filed on Nov. 25, 2019, now International Publication No. WO 2020/104702 Al, published on May 28, 2020, which International Application claims priority to German Application No. 10 2018 009 255.1, filed on Nov. 24, 2018, both of which are incorporated herein by reference in their entirety.

The present invention relates to methods for the welding of foam particles equipped with a surface modification, by means of electromagnetic waves.

In the production of molded particle foam parts from foam particles, foam particles are welded together under the influence of heat. The necessary heat for this purpose may be transmitted to the foam particles to be welded to one another by means of, amongst other things, electromagnetic waves. To improve the transfer of heat to foam particles, additional heat-transferring substances may be required.

WO 2013/050581 A1 discloses a method for the production of particle foam parts in which a mixture of foam particles and dielectric transfer fluid is heated by means of electromagnetic waves, in order to weld the foam particles into a particle foam part. Used as electromagnetic waves are radio waves or microwaves. The material of the foam particles is made from polypropylene (PP).

U.S. Pat. No. 3,060,513 discloses a method for the sintering of wet thermoplastic foam particles. The particles are heated dielectrically and simultaneously compressed in the mold. Electromagnetic waves at a frequency of around 2 to 1000 MHz are applied.

A similar method is described in U.S. Pat. No. 3,242,238, in which foam particles are wetted by an aqueous solution and subjected to an electromagnetic field with a frequency of around 5 to 100 MHz.

Described in GB 1,403,326 is a method for the welding of expandable polystyrol foam particles, in which the particles are wetted by an aqueous solution and subjected to an electromagnetic field of 5 to 2000 MHz.

Disclosed by WO 01/64414 A1 is another method, in which polymer particles of polyolefins, wetted by a liquid medium, are heated by electromagnetic waves, in particular microwaves.

Here the temperature in the molding tool is regulated by controlling the pressure therein.

In each of the methods described above, wet foam particles are heated by electromagnetic waves, with the electromagnetic energy being absorbed by the fluid and transferred to the particles.

U.S. Pat. No. 5,128,073 discloses thermoplastic particles which are coated with a material which absorbs high-frequency energy. These particles may be heated by electromagnetic waves, with the coating absorbing the electromagnetic energy and releasing it in the form of heat to the foam particles. For welding the foam particles, electromagnetic waves in the range of 40 MHz to 2450 MHz are used. The described coating is obtained by mixing with organic materials which absorb high frequencies. Cited as examples are: alkanolamines such as triethanolamine, tripropanolamine, monohydroxyamine, dihydroxyamine; alkyl glycols such as 2-hydroxyethyl ether; polyalkylene glycols such as polyethylene glycol; together with aqueous solutions of the same. In accordance with the embodiments, the respective coating materials are applied to the foam particles either with or without solvents, by mixing with the foam particles, whereupon the mixture concerned is heated by radiation in a forming environment.

The aforementioned methods have in part been known for decades. However, it has not so far been possible to implement them in practice. For this, there are various reasons. On laboratory samples, these methods function very well. The transition into industrial production is however difficult to accomplish and, at least until recently, has not been successful. An important reason for this is that the heat cannot always be introduced evenly into the foam particles, with the consequence of uneven welding in the particle foam part.

In more recent times it has been possible to improve the efficiency and reliability of the welding of foam particles by means of electromagnetic radiation through the ongoing development of molding tools used for this purpose. DE 10 2016 123 214 A1 describes suitable apparatus and also discloses that the need for a heat transfer medium depends on the properties of the particles to be welded.

Particle foam parts may therefore be made for example from foam particles based on polyurethane (eTPU). Polyurethane has a dielectric loss factor D of 0.2 in the case of electromagnetic radiation with a frequency of 1 MHz. The dielectric loss factor of polypropylene (PP) under electromagnetic radiation with a frequency of 1 MHz, on the other hand, is only 0.00035. The absorbing capacity of polyurethane is therefore significantly greater than that of polypropylene. Because of this, it is possible, without additional heat-transferring materials, in particular without aqueous solutions, to introduce into the foam particles the heat needed for welding them, since the foam particles themselves absorb the electromagnetic waves.

Instead of foam particles based on polyurethane it is also possible to use foam particles of expandable thermoplastics based on polyether block amide (ePBA), based on polyl actate PLA), based on polyamide (ePA), based on polybutylene terephthalate (ePBT), based on polyester ether elastomer (eTPEE) or based on polyethylene terephthalate (ePET).

Each of these materials has functional groups (amide group, urethane group or ester group) which effect a dipole moment. These functional groups are responsible for the fact that the molecules absorb radio-frequency radiation (RF radiation). Therefore, other thermoplastics which have such functional groups causing a dipole moment are also suitable for welding with RF radiation.

But foam particles based on ePP (expandable polypropylene) or ePS (expandable polystyrol) may also be welded into particle foam parts. Since these materials absorb electromagnetic radiation only to a very limited extent, it is in such cases necessary to add a dielectric heat transfer medium, such as e.g. water.

Generally, foam particles are made from so-called low-energy plastics, i.e. plastics with at least one of the following features:
- free surface energy is below 40 mN/m
- the contact angle of water is greater than 45°, i.e. water wettability is minimal or absent, the material is hydrophobic
- they are not dyeable out of the aqueous phase
- they have a surface resistance of more than 106 W.

Non-limiting examples which may be cited are plastics from the substance classes of the aramides, polyesters, polyamides, polyacrylates, polyacryl nitriles, (thermoplastic) polyurethanes, (per)fluorised polyolefins, e.g. polytetra fluoroethylene or polyvinylide (di)fluoride, polysulfones, polyimides, polyolefins, carbon, etc., together with co- or terpolymers thereof.

The term "particle" is used below to mean molded bodies made from the aforementioned polymers which, on account of their formation, are characterized mainly by their diameter, with this lying in both the nanometer and the centimeter range. The molded bodies are made of pore-free polymer or of open- and/or closed pore polymer.

The porosity of the polymers is also described by the term "expanded", for example ePET stands for expanded polyethylene terephthalate and eTPU for expanded thermoplastic polyurethane.

Hereafter, molded bodies with such properties are described as "particles". In particular in connection with surface modification(s), the term "material" is also used.

Particles made from low-energy plastics, in particular from polyolefins or polyesters, have a number of disadvantages:
 the materials easily charge electrostatically, making handling and further processing difficult
 the materials are not water-wettable, which limits their use as filter material for aqueous media
 the material surfaces have no functional groups or only such as may be activated by (chemically) drastic means.

For use as filling material for composite materials, this is unfavorable: even with use as matrix material of a reactive epoxy resin, the contact between filling material and matrix remains purely physical-mechanical. If moisture penetrates this area, delaminations may result. Also, surface coloring directly from the aqueous phase is not possible. For use in connection with the welding of foam particles by electromagnetic waves, in particular the hydrophobic properties of the foam particles used are disadvantageous since they make considerably more difficult an even wetting with aqueous heat transfer media. This can lead, during production in a molding tool, to the transfer to the foam particles of too much heat at some points and too little heat at others. This in turn may lead to inferior particle foam parts, which are not bonded evenly throughout.

The loose mixing of foam particles with substances absorbing high-frequency energy, referred to above, has the drawback that such substances are not bonded durably to the particles.

A method described in EP 2 6 70 906, for surface modification with the aid of an aqueous solution of polyvinyl alcohol containing silanol(ate) groups relates solely to textile substrates.

The invention is based on the problem of further developing methods for the welding of expandable thermoplastic foam particles by means of electromagnetic waves so that the most evenly possible welding is obtained in the production of particle foam parts from foam particles that are evenly welded.

The problem is solved by methods for the welding of foam particles using electromagnetic waves, in which foam particles with a surface modification are welded in a molding tool by electromagnetic waves, wherein the surface modification is made by providing that the foam particles are contacted by a solution containing polymers which are capable of forming intra- or inter-molecular covalent bonds, under the conditions required for this purpose.

Due to the nature of the creation of the surface modification by means of the forming of intra- and/or inter-molecular covalent bonds, a reticular coating is formed which wholly or partly surrounds the foam particles, so that the surface modification is permanently joined to the particle, even if no covalent bond to the foam particles is formed.

In methods according to the invention, the surface modification may be made hydrophilic.

Hydrophilic surface modifications are advantageous since they improve the wettability of foam particles by heat transfer media such as water or aqueous solutions, by which in turn the uniformity of wetting is improved and a more even welding of the foam particles is promoted. The hydrophilicity may be adjusted via the provision of suitable hydrophilic groups in the polymers used to create the surface modification. The degree of hydrophilicity may be tailored by varying the type and/or number of the hydrophilic groups used.

The permanent functionalizing of the material surfaces permits the ionogenic and/or covalent bonding of water-soluble chemicals, e.g. of dyes, metal-binding ligands or biologically-active bonds, improves water wettability, thereby reducing electrostatic chargeability, improves water absorption and retention properties, permits capillary water movement, etc. Functional groups anchored stably to the material surface also facilitate a covalent bond between particle and chemically-reactive matrices, giving composite materials enhanced resistance to delaminations.

In the methods according to the invention, the foam particles with surface modification may be wetted with an aqueous solution before being welded in the molding tool by electromagnetic waves.

In this way, during welding, water may be used as a medium for the absorption of electromagnetic waves while this, in combination with a hydrophilic surface modification which improves the wettability of an otherwise hydrophobic foam particle is especially advantageous and therefore preferred.

In the case of the foam particles used in the methods according to the invention, the production of the surface modification may include as an additional step the removal of the solvent used in this process.

Removal of the solvent after the surface modification but before welding facilitates handling of the foam particles with surface modification without solvent. Solvent-free, i.e. substantially dry, foam particles may be stored longer than foam particles provided with solvents. The latter may in principle be welded by electromagnetic waves with or without heat transfer medium. Removal of the solvent which was used in production, makes possible wetting with a heat transfer medium, which differs from the solvent used in production of the surface modification. This is in particular advantageous when solvent and heat transfer medium are not in harmony with one another.

In the methods according to the invention, the surface modification may have polar groups to improve the absorption of electromagnetic radiation, in particular in the radio-frequency range.

By this means, the absorbing capacity of the particle surface is improved, which enhances the heat input at the particle surface and thus promotes even welding.

Suitable polar groups may be chosen from ester, acetal or urethane groups.

The polymers capable of forming intra- or inter-molecular covalent bonds may have functional groups selected from sulfonic acid, thiol, ammonium, carboxyl or silanol groups which are constituents of polyvinyl alcohol, polyvinyl pyrrolidone, polyvinyl formamide, polyacrylic acid (ester).

The cited functional groups allow the polymers, of which they are part, to form intra- or inter-molecular covalent bonds in a simple manner, while in principle other functional groups and polymers are also possible.

Preferably the foam particles are provided with a surface modification, involving contacting by a an aqueous carboxyl- or silanol-group-containing polyvinyl alcohol solution, wherein the pH value of the aqueous carboxyl- or silanol-group-containing polyvinyl alcohol solution lies between 2 and 5, and wherein the aqueous carboxyl- or silanol-group-containing polyvinyl alcohol solution where applicable comprises further substances which influence the surface tension and/or viscosity of the solution.

Suitably modified polyvinyl alcohols are especially good for cross-linking, have hydrophilic groups in the form of hydroxyl (—OH) groups and also. if necessary for production reasons, acetyl (—OOC—CH$_3$) groups, which are polar and also facilitate further modifications.

The lower limit of the concentration of the polyvinyl alcohol solution containing carboxyl or silanol groups may be 0.001, 0.01, 0.5 or 1% (w/v), the upper limit 40% (w/v), 10% (w/v), 2% (w/v) or 1% (w/v).

Here and below, the respective concentration specification "% (w/v)" means the same as "g/100 ml", i.e. 1% (w/v) equals 1 g/100 ml, 2% (w/v) equals 2 g/100 ml, etc.

Concentrations of 1% (w/v) have turned out to be especially advantageous. Higher upper limits may be advantageous when it is a matter of providing surface modifications with greater layer thickness. That may be advantageous, for example, to increase the concentration of certain function groups located on or near the surface. Lower concentrations may be advantageous when it is a matter of providing surface modifications with lower layer thickness. The latter is especially advantageous when excessive layer thickness would work against welding together of the particles.

Surface modifications provided with OH groups may be further modified through covalent bonding of water-soluble substances to the hydroxyl (—OH) groups present there, by means of ester, acetal, urethane or ether bonding.

In this way, the particles used for welding may be tailor-made by the provision of further suitable modifications. For example, in this way, further groups absorbing electromagnetic radiation may be introduced close to the particle surface, and/or the hydrophilicity of the particle surface may be further modified, and/or the coloring of particles, etc. may be facilitated.

In methods according to the invention, the foam particles may consist of: polyurethane (ePU), expandable thermoplastics based on polyether block amide (ePEBA), based on polylactate (PLA), based on polyamide (ePA), based on polybutylene terephthalate (ePBT), based on polyester-ether-elastomer (eTPEE), based on polyethylene terephthalate (ePET), or on expandable polyethylene (ePE), expandable polypropylene (ePP) or expandable polystyrol (ePS).

These materials are especially preferred materials for foam particles.

The electromagnetic waves used in methods according to the invention are preferably electromagnetic RF waves. The electromagnetic RF waves preferably have a frequency of at least 30 KHz or at least 0.1 MHz, in particular at least 1 MHz or at least 2 MHz and preferably at least 10 MHz.

The electromagnetic RF waves preferably have a maximum frequency of 300 MHz.

The generator for generation of electromagnetic waves preferably generates electromagnetic waves with an amplitude of at least $10^3$V and in particular at least $10^4$V. Customary generators generate RF waves with a frequency of 27.12 MHz.

The electromagnetic waves may also be microwaves in the frequency range 300 MHz to 300 GHz.

The invention will be explained in detail below with reference to the Figures and embodiments.

The term "surface modification" used here covers the fact that the surfaces of non-surface-modified materials differ from those of surface-modified materials in at least one of the following points:
- in the results of surface analysis (e.g. by means of ESCA (Electron Spectroscopy for Chemical Analysis) or SIMS (Secondary Ion Mass Spectroscopy))
- in water wettability
- in electrostatics
- in chemical reactivity, e.g. in colorability with water-soluble dyes from the aqueous phase.

Particles made from low-energy plastics may be surface-modified as described in EP 2 670 906. Advantageously, further compounds may be used for surface modification.

According to the invention, the surface modification is effected from particles made from low-energy plastics, by contacting them with a solution containing polymers capable of forming covalent inter- and intra-molecular bonds, under the conditions required for this purpose, such as solvent (mixture), pH, temperature pressure, energy input, and by removing the solvent.

Polymers capable of forming covalent inter- and intra-molecular bonds possess additional functional groups, such as e.g. sulfonic acid, thiol, ammonium, carboxyl or silanol groups which are constituents of e.g. polyvinyl alcohol (PVA), polyvinyl pyrrolidone, polyvinyl formamide, polyacrylic acid (ester). Examples which may be cited are polyvinyl alcohol containing carboxyl groups or polyvinyl alcohol containing silanol groups. These polyvinyl alcohols equipped with carboxyl or silanol groups are commercially available from Kuraray Europe GmbH, Hattersheim as KURARAY POVAL™ K (new product designation KURARAY POVAL™ 25-88 KL) and KURARAY POVAL™ R (new product designation KURARAY POVAL™ 25-98 R). In this connection, reference is made to the relevant current data sheets of the company.

Used preferably for permanent surface modification are aqueous solutions of polyvinyl alcohols containing carboxyl or silanol groups. The concentration of the polymers used depends in particular on the subsequent intended use of the particles or of the product made from them and may vary between 0.0001% (w/v) and 40% (w/v); as a rule, the concentrations lie between 0.01% (w/v) and 10% (w/v), preferably 0.5 to 2% (w/v), and especially preferred 1%. The production of such solutions is known; see e.g. data sheets referred to above.

Further substances, which lower the surface tension of water, for example low-aliphatic alcohols, surfactants, wetting agents, may be added to these polymer solutions. Compounds which modify the viscosity of the solution, such as for example pyrogenic silica or metal salts, may likewise be part of the solution. Their selection, familiar to the person skilled in the art, is made with a view to the later intended purpose of the surface-modified materials, their compatibility with the dissolved polymer capable of forming covalent intra- and inter-molecular bonds, the material types and material properties to be modified, and the contacting and drying conditions.

The pH of the polymer solution used depends on the reactivity of the polymers used; in the case of polyvinyl alcohol containing carboxyl or silanol groups it is 3±1, to form ester or siloxan bonds, preferably in the acids.

The temperature of the polymer solution used may lie between 3° C. and 95° C., lying preferably between 15 and 65° C., quite preferably at room temperature.

The low-energy materials are contacted with a solution containing polymers capable of forming inter- and intra-molecular bonds. The term "contacting" describes here that the whole or specific parts of the surface of the low-energy material is or are placed in a position to enter into physical-chemical interactions with the dissolved substances in the solution and includes on the molecular plane terms such as physisorption and chemisorption and on the production technical plane terms such as bringing into intimate contact, varnishing, enveloping, painting, wetting, impregnating, spraying, painting, dipping, etc.

The contacting may be effected either manually or in-line with the help of known aids and at production speed.

The duration of contacting of the low-energy materials with the polymer solution lies in the range between seconds and several days and is in each case determined by taking into account the polymer concentration used, the subsequent intended use of the material, its properties such as texturing, compactness, density, etc. and also economic factors.

After the low-energy materials have been contacted by the polymer solution, the solvent, preferably water, is removed where applicable, which is usually effected by drying the materials wetted with the polymer solution. The drying temperatures may lie between 1° and over 170° C. They are determined from case to case, taking into account the subsequent intended use and the properties of the material used. Preferably they are at room temperature, especially preferably between 30 and 70° C. and quite especially preferably between 70 and 130° C.

The degree of any drying depends on the subsequent intended use of the materials, so that the latter may have a residual moisture content between 0% and 40%, relative to non-surface-modified materials.

The proof of the permanent presence of functional groups is given advantageously by water-soluble (addition) dyes capable of covalent bonding. For example, Simplicol® from the company Brauns-Heitmann of Warburg is suitable for proof of hydroxyl groups. The dye developed for permanent coloring of cotton cannot be washed out even after several washes with hot water, which is rated as proof of the stability of the surface modification.

It is assumed that the contacting and subsequent drying described above have the effect that the polymers capable of forming covalent inter- and intra-molecular bonds first of all build up on the surface of the particles with continuing evaporation of the solvent water. In the case of polyvinyl alcohol containing carboxyl groups, continuing evaporation of the solvent leads to a reaction in which the carboxyl and hydroxyl groups react with one another, primarily in an intermolecular manner, to form ester bonds. In the case of polyvinyl alcohol containing silanol groups, continuing evaporation of the solvent leads to a reaction of the silanol groups (though condensation reaction and with separation of water primarily intermolecular) with one another. In both cases this leads to a giant molecule enveloping the particle surface and adhering firmly to it. Through targeted adjustment of the concentration of the polyvinyl alcohol solution containing carboxyl and silanol groups, it is possible to reach a state where both thin, possible also monomolecular, layers may be applied to the surface, but also thick layers, which join the individual particles firmly to one another or also close gaps (spandrels) between the particles.

Crosslinking, however, begins even without removal of the solvent. Therefore, it is not necessary to remove the solvent. In particular, when the solvent can at the same time serve as heat transfer medium, it may be advantageous not to remove the solvent, or not completely.

In the case of use of polyvinyl alcohol containing carboxyl and silanol groups, the hydroxyl (—OH) groups anchored stably on the surface are available for covalent bonding of water-soluble substances via ester or acetal or urethane or ether compounds. Esterification may be effected with inorganic or organic acids. For example, the —OH groups may be esterified with di-, tri- or polycarboxylic acids, so that the material surface in aqueous solution receives a negative, anionic charge. Through esterification with zwitterions, e.g. amino acids, the surface receives a cationic, positive charge, which may be used for further reactions. Compounds containing aldehyde groups, as for example glyceraldehydes, may be added to the —OH groups, acid-catalysed, to form an acetal bond, in this case increasing the number of —OH groups on the material surface. Compounds containing double bonds, such as e.g. vinyl sulfonic acid, may be added to the —OH groups, peroxide-catalyzed, to form hydrolysis-stable ether bonds. In this case the surface, at pH>2, receives a negative anionic charge due to the $SO_3$ groups.

These additional surface modifications expand the spectrum of use of such surface-modified particles made from low-energy plastics in technical fields of application including applications in medicine, environmental technology and biotechnology.

The particles made from low-energy plastics, surface-modified according to the method, may be used for the production of molded bodies by heat development close to the surface using electromagnetic radiation, i.e. by means of microwaves, as fillers for composite materials, as moisture-binding insulation material, as filter materials, as drainage material, as substrates for the immobilization of biologically active substances, as cell culture substrates, as currentless, metallizable substrates, etc.

With regard to methods according to the invention, surface modification leads to improved wettability with water. The inventors also assume that, irrespective of that, the functional groups present improve the absorbing capacity of electromagnetic radiation at the surface. This leads altogether to improved welding.

The improved capacity to absorb electromagnetic radiation, locally on the surface of the particles, results in each case from the structure of the surface modification. Functional groups present there (e.g. ester group, amide group, urethane group) effect a dipole moment. Such functional groups are conducive to the absorption of electromagnetic radiation, in particular radio-frequency radiation.

Foam particles based on polyurethane (ePU), polyether block amide (ePBA), polylactate PLA), polyamide (ePA), polybutylene terephthalate (ePBT), polyester ether elastomer (eTPEE) or polyethylene terephthalate (ePET) may in principle also be used, and these materials absorb electromagnetic waves well. Each of these materials, which are good at absorbing electromagnetic radiation, in particular RF waves, has a functional group (here: amide group, urethane group or ester group) which effects a dipole moment. These functional groups are responsible for the molecules absorbing the electromagnetic radiation. Therefore, other thermoplastics which have such function groups causing a dipole moment, may also be heated suitably with electromagnetic radiation, using RF waves. The same also applies, irrespective of the nature of the foam particles, to coatings which have such groups.

The improved wettability with water arises from the presence of polar function groups. In the case of polyvinyl alcohol these are alcohol (—OH) groups and, where applicable, acetate groups (carboxylic acid ester groups) still present in the polyvinyl alcohol for production reasons. There are also silanol or carboxyl groups where suitably modified polyvinyl alcohols are used.

Methods according to the invention are superior to methods of the prior art inasmuch as they facilitate an improved and above all more even input of heat. This is discussed in detail below with the aid of the embodiments.

EXAMPLE 1

KURARAY POVAL™ R (new product designation KURARAY POVAL™ 25-98 R) from the company Kuraray Europe GmbH, Hattersheim is used as polyvinyl alcohol containing silanol groups.

For surface modification, a 0.5% (w/v) aqueous KURARAY POVAL™ R solution is used. At room temperature, 5 g polymer are introduced into 1000 ml deionized water and then heated under constant stirring to around 90° C. until the polymer has completely dissolved. The pH is set at 3 with diluted hydrochloric acid.

Particles: Armashape. This involves particles or hollow beads of polyethylene terephthalate with a diameter of <0.5 µm from the company Armacell Benelux S.A., Thimister-Clermont, Belgium.

Contacting: Around 200 ml ArmaShape are poured into a plastic screen. The screen is placed on a suitable glass and KURARAY POVAL™ R solution is poured on to the beads until they float. They are then pressed back into the solution by a suitable plastic cover. Contacting time is around 5 min.

Drying: The polymer solution is allowed to run out of the screen. The beads are then spread out on a glass plate and dried at 70° C. in the circulating air oven.

Result: Beads contacted with KURARAY POVAL™ R solution show a clear coloring, which cannot be washed out, with Simplicol® (a dye for coloring cotton, made by the company Brauns-Heitmann, Warburg)—untreated controls did not bind the dye. Beads contacted with KURARAY POVAL™ R solution are water-wettable.

EXAMPLE 2

As example 1, only a POVAL™ K (new product designation KURARAY POVAL™ 25-88 KL) is used.

EXAMPLE 3

PET beads are surface-modified as described in Example 1, wetted with water and used to fill a glass syringe in the wet state. With the plunger rod they are compressed until no more water can be seen coming out of the syringe. The pressure of the plunger rod on the beads is maintained by suitable clamps. This construct is subjected to the electromagnetic energy of a microwave with 600 watts power for 40 min. After cooling, a stable molded body of baked-together PET beads corresponding to the syringe interior may be withdrawn.

EXAMPLE 4

Beads or foam particles of ePP from the firm Kaneka are as described in example 1 surface-modified, wetted with water and poured into a glass syringe. With the plunger rod they are compressed until no more water can be seen coming out of the syringe. The pressure of the plunger rod on the beads is maintained by suitable clamps. This construct is subjected to the electromagnetic energy of a microwave with 600 watts power for 40 min. After cooling, a stable molded body of baked-together or welded ePP beads corresponding to the syringe interior may be withdrawn.

EXAMPLE 5

Foam particles of EPP from Kaneka or EPS from the firms BASF and Knauf are welded together in a test molding tool by means of electromagnetic waves under various conditions, and specifically:
  wetted with distilled water (as comparative example)
  coated with PVA (1% (w/v) in water) in the presence of water (according to the invention)
  with polyethylene glycol in the presence of water (as comparative example).

As PVA, KURARAY POVAL™ R (new product designation KURARAY POVAL™ 25-98 R) in the form of a 1% (w/v) aqueous solution was used, i.e. a polyvinyl alcohol containing silanol groups.

Each experiment is repeated 5 times. The supply voltage for frequency generation applied over a period, always the same, of around 22 seconds, is around 6.5 kW. The molding space is such that, as test molding, a square foam panel measuring 100 mm×100 mm×25 mm is formed. The test molding tool or its support fixture is provided with an optical temperature sensor, which records the surface temperature of the workpiece of foam particles welded or to be welded. At the same time the wall of the mold contains a sensor which records the foam pressure, i.e. the pressure in the mold. There is also a measuring instrument in the electrical circuit, which measures the electrical power output at the capacitor in the form of radiation. This corresponds to the power absorbed by the foam particles during welding.

The maximum power absorbed in each case reflects the absorbing capacity of the material tested. The higher the measured maximum power, the greater the absorbing capacity of the tested material. The energy corresponds to the integral under the time-power curve and reflects the absorbed radiation energy.

Figure 1:
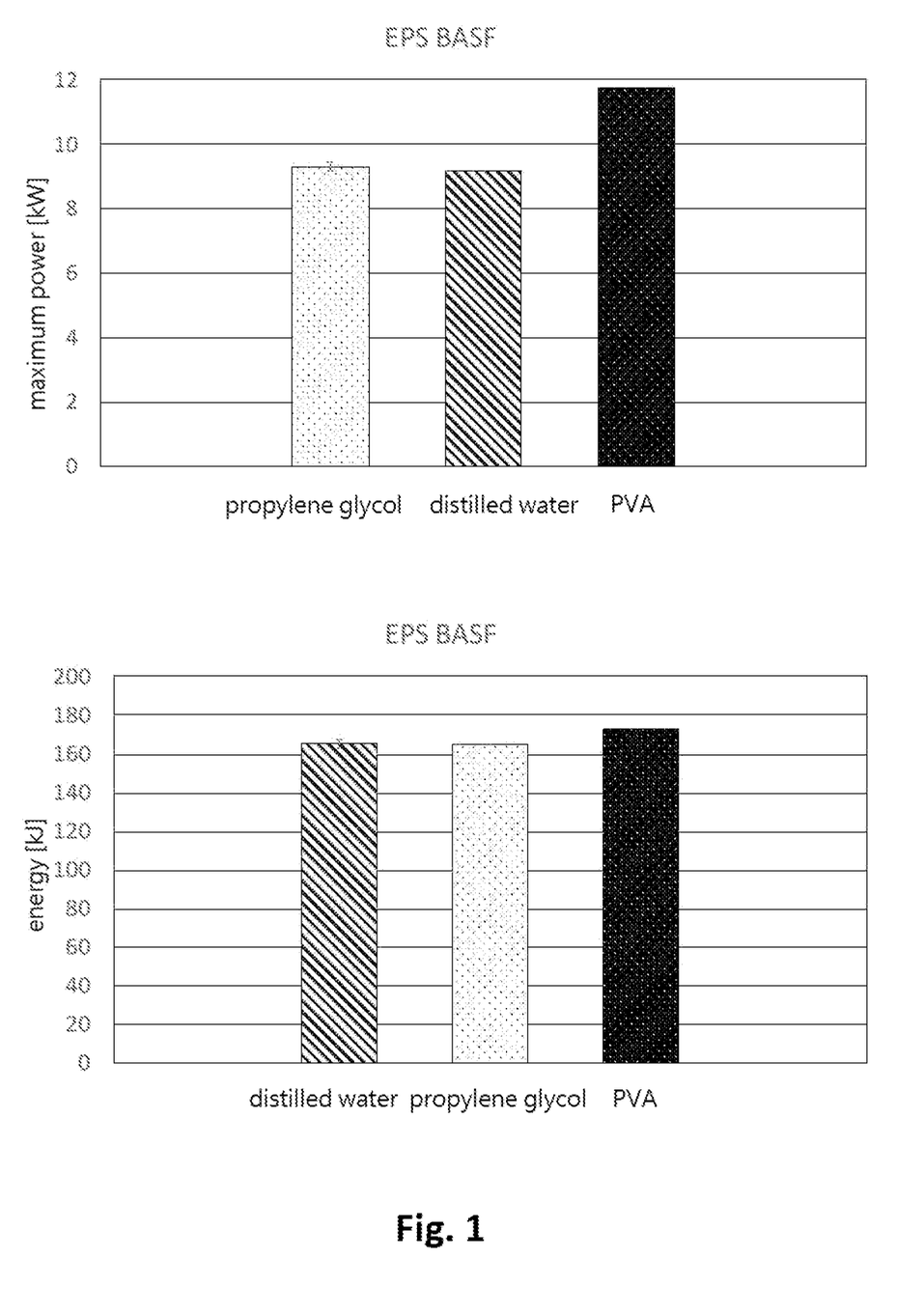
Figure 2:
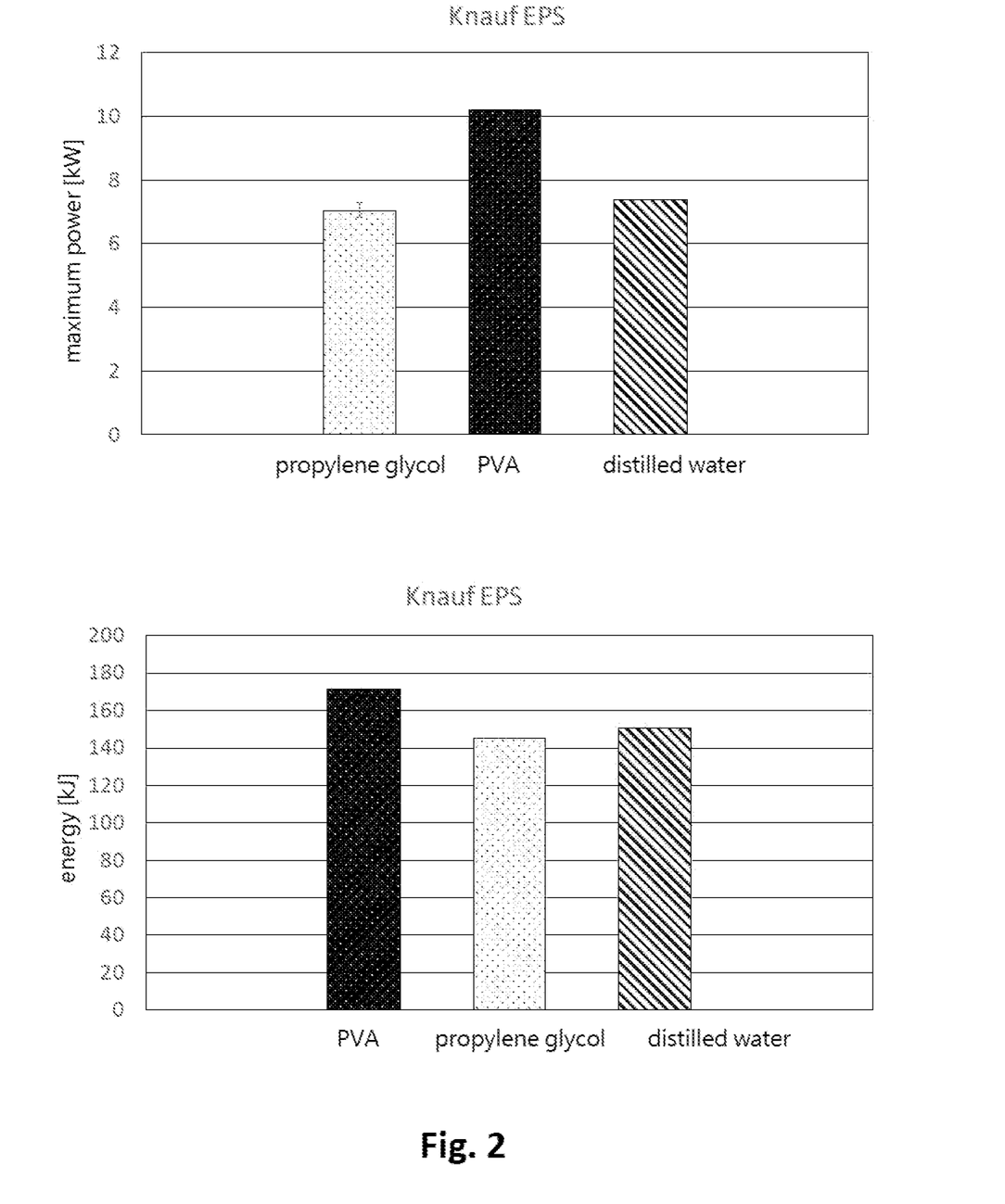
Figure 3:
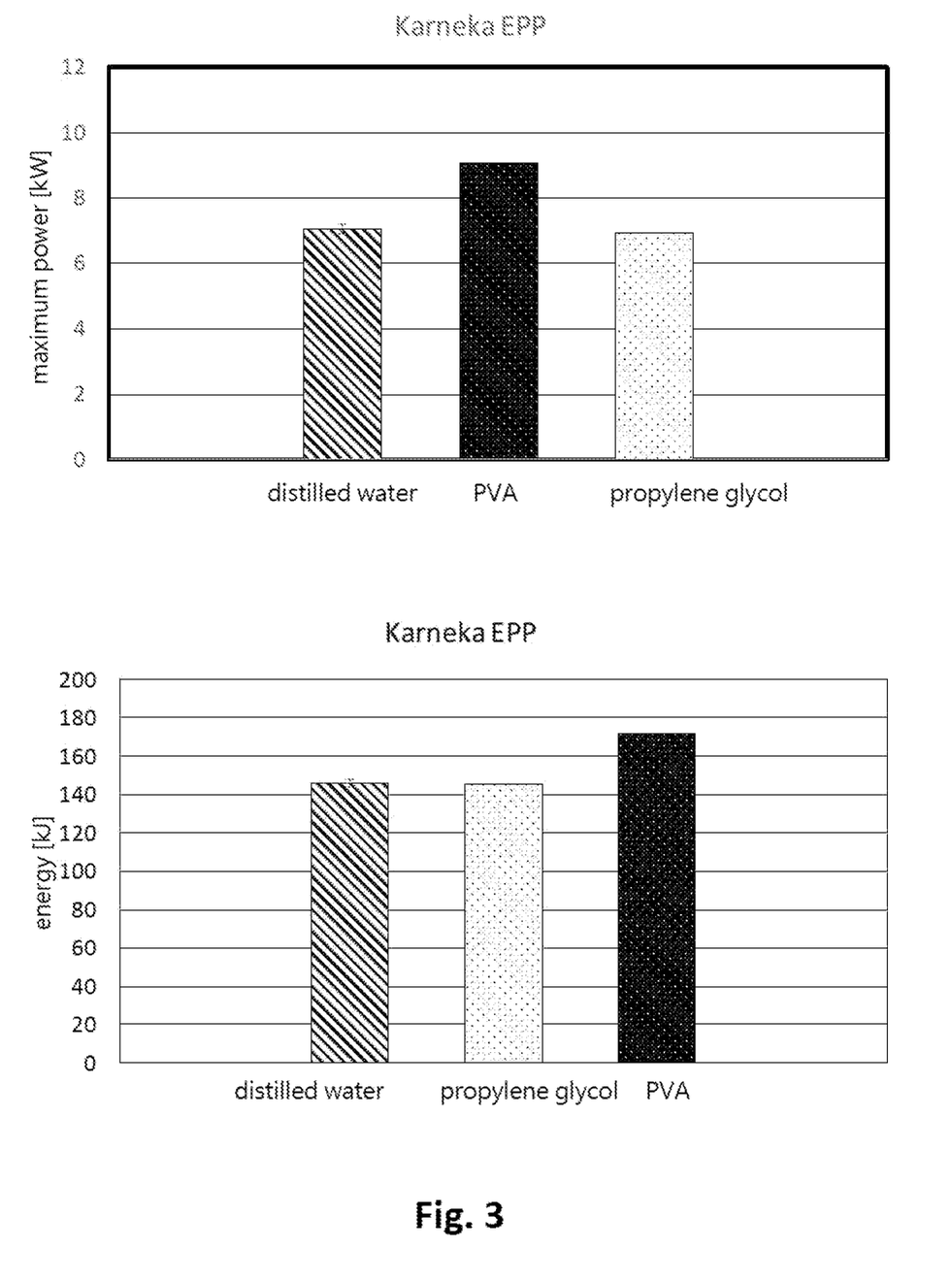

The results are shown in the bar charts of FIGS. 1 to 3. Shown in each case is the maximum power and also the energy absorbed for the 3 different types of treatment. FIG. 1 summarizes the results for the EPS foam particles of BASF, FIG. 2 for the EPS foam particles from Knauf, and FIG. 3 for the EPP foam particles from Kaneka.

It follows from this that distilled water (in each case colorless) and polyethylene glycol (in each case grey) are both almost equally poor heat transfer media, since the maximum power absorbed and energy converted in each case, for foam particles treated with distilled water or polyethylene glycol, is distinctly lower in comparison with particles treated with PVA (in each case black).

Additional Information

In example 5 above, removal of the solution during production of the PVA coating was dispensed with. The particles provided with surface modification solution were additionally mixed with the same amount of water (14 g water and 14 group surface modification solution were used).

To avoid any possible polymerizing-out of polymer solution, e.g. PVA solution, and therefore possible adherence or sticking to mold surfaces, foam particles may be freed from solvent, i.e. dried, after production of the surface modification, and then wetted with water in the molding tool.

If removal of solvent for the purpose of drying is not provided, then surplus surface modification solution may be removed by centrifugation, for example in a tube drum screen, so that only the (minimal) amount of surface modification solution required for welding remains on the surface of the particles.

The above remarks serve to explain the invention and are not to be interpreted as restrictive.

The surface modification may also be effected by:
methods for the surface modification of particles made from low-energy plastics, characterized in that the particles are contacted, under the conditions required for this purpose, by a solution containing polymers which are capable of forming covalent inter- and intra-molecular bonds, and the solvent is then removed the same methods, characterized in that aqueous solutions of polyvinyl alcohol containing carboxyl or silanol groups at pH 3±1 are used.

Particles according to the invention, made from low-energy plastics, may be characterized in that they have been surface-modified by the aforementioned methods. Such particles according to the invention may be used as substrates for the covalent bonding of (primarily) water-soluble substances through ester, urethane, acetal or ether bonds.

The particles made from low-energy plastics and surface-modified as in the two paragraphs above may be used as substrate for the production of molded bodies through heat developed close to the surface, e.g. by means of microwaves, as moisture-binding insulating material, as fillers for composite materials, as filter materials, drainage material, as substrates for the immobilization of biologically active substances, as cell culture substrates, as currentless, metallizable substrates, etc.

The invention claimed is:

1. Methods for welding of foam particles using electromagnetic waves, in which foam particles with a surface modification are welded in a molding tool by electromagnetic waves, wherein the surface modification is made by providing that the foam particles are contacted by a solution containing polymers that are capable of forming intra-or inter-molecular covalent bonds, and the polymers that are capable of forming intra-or inter-molecular covalent bonds are selected from polyvinyl alcohol or polyvinylpyrrolidone and have carboxyl functional groups.

2. Methods according to claim 1, wherein the surface modification is hydrophilic.

3. Methods according to claim 1, wherein the foam particles with surface modification are wetted with an aqueous solution before being welded in the molding tool by electromagnetic waves.

4. Methods according to claim 1, further comprising removing a solvent from the foam particles after contacting the foam particles with the solution containing polymers.

5. Methods according to claim 1, wherein the surface modification has polar groups to improve the absorption of electromagnetic radiation in the radio-frequency range.

6. Methods according to claim 1, wherein the surface modification has polar groups to improve the absorption of electromagnetic radiation in the radio-frequency range, and the polar groups are selected from ester, acetal or urethane groups.

7. Methods according to claim 1, wherein the foam particles are provided with the surface modification by contacting the foam particles with the solution containing the polymers capable of forming intra-or inter-molecular covalent bonds, the solution being an aqueous carboxyl-group-containing polyvinyl alcohol solution, wherein the pH value of the solution lies between 2 and 5, and wherein the solution comprises further substances which influence the surface tension and/or viscosity of the solution.

8. Methods according to claim 7, wherein the concentration of the polyvinyl alcohol solution containing carboxyl is 0.001% (w/v) to 40% (w/v), 0.01% (w/v) to 10% (w/v), 0.5 to 2% (w/v), or 1% (w/v).

9. Methods according to claim 1, wherein the surface modification includes hydroxyl (—OH) groups and is further modified by adhesive bonding of water-soluble substances to the hydroxyl (—OH) groups via ester, acetal, urethane or ether bonds.

10. Methods according to claim 1, wherein the foam particles consist of polyurethane (ePU), or of expandable thermoplastics based on polyether block amide (ePEBA), based on polylactate (PLA), based on polyamide (ePA), based on polybutylene terephthalate (ePBT), based on polyester-ether-elastomer (eTPEE), based on polyethylene terephthalate (ePET), or of expandable polyethylene (ePE), expandable polypropylene (ePP) or expandable polystyrol (ePS).

11. Methods according to claim 1, wherein the surface modification is hydrophilic, and the foam particles with surface modification are wetted with an aqueous solution before being welded in the molding tool by electromagnetic waves.

12. Methods according to claim 7, wherein:
the surface modification includes hydroxyl (—OH) groups and is further modified by adhesive bonding of water-soluble substances to the hydroxyl (—OH) groups via ester, acetal, urethane or ether bonds.

13. Methods according to claim 8, wherein:
the surface modification includes hydroxyl (—OH) groups and is further modified by adhesive bonding of water-soluble substances to the hydroxyl (—OH) groups via ester, acetal, urethane or ether bonds.

14. Methods according to claim 1, wherein:
the foam particles consist of polyurethane (ePU), or of expandable thermoplastics based on polyether block amide (ePEBA), based on polylactate (PLA), based on polyamide (ePA), based on polybutylene terephthalate (ePBT), based on polyester-ether-elastomer (eTPEE), based on polyethylene terephthalate (ePET), or of expandable polyethylene (ePE), expandable polypropylene (ePP) or expandable polystyrol (ePS).

15. Methods according to claim 7, wherein:
the foam particles consist of polyurethane (ePU), or of expandable thermoplastics based on polyether block amide (ePEBA), based on polylactate (PLA), based on polyamide (ePA), based on polybutylene terephthalate (ePBT), based on polyester-ether-elastomer (eTPEE), based on polyethylene terephthalate (ePET), or of expandable polyethylene (ePE), expandable polypropylene (ePP) or expandable polystyrol (ePS).

16. Methods according to claim 7, wherein:
the resulting surface modification includes hydroxyl (—OH) groups and is further modified by adhesive bonding of water-soluble substances to the hydroxyl (—OH) groups via ester, acetal, urethane or ether bonds; and
the foam particles consist of polyurethane (ePU), or of expandable thermoplastics based on polyether block amide (ePEBA), based on polylactate (PLA), based on polyamide (ePA), based on polybutylene terephthalate (ePBT), based on polyester-ether-elastomer (eTPEE), based on polyethylene terephthalate (ePET), or of expandable polyethylene (ePE), expandable polypropylene (ePP) or expandable polystyrol (ePS).

\* \* \* \* \*